US 12,502,934 B2

(12) United States Patent
Ahnsjö et al.

(10) Patent No.: US 12,502,934 B2
(45) Date of Patent: Dec. 23, 2025

(54) HEATING SYSTEM, COMPRISING A FUEL-OPERATED HEATING DEVICE

(71) Applicant: Webasto SE, Stockdorf (DE)

(72) Inventors: Mattias Ahnsjö, Stockdorf (DE); Drago Komusanac, Stockdorf (DE); Thorsten Pannwitz, Stockdorf (DE)

(73) Assignee: Webasto SE, Stockdorf (DE)

( * ) Notice: Subject to any disclaimer, the term of this patent is extended or adjusted under 35 U.S.C. 154(b) by 402 days.

(21) Appl. No.: 18/021,465

(22) PCT Filed: Aug. 18, 2021

(86) PCT No.: PCT/EP2021/072895
§ 371 (c)(1),
(2) Date: Feb. 15, 2023

(87) PCT Pub. No.: WO2022/038169
PCT Pub. Date: Feb. 24, 2022

(65) Prior Publication Data
US 2023/0339290 A1    Oct. 26, 2023
US 2025/0170873 A9    May 29, 2025

(30) Foreign Application Priority Data

Aug. 19, 2020 (DE) .................. 10 2020 121 759.5

(51) Int. Cl.
B60H 1/22 (2006.01)
(52) U.S. Cl.
CPC .................. B60H 1/2206 (2013.01)

(58) Field of Classification Search
CPC ........... B60H 1/2206; B60H 2001/224; B60H 2001/2256; B60H 2001/2231
USPC .......................................................... 431/6
See application file for complete search history.

(56) References Cited

U.S. PATENT DOCUMENTS 4,002,882 A * 1/1977 McCutchen ......... H05B 1/0236
361/264
2019/0275862 A1   9/2019 Peitz et al.

FOREIGN PATENT DOCUMENTS

| DE | 19605326 C1 * | 2/1997 | .......... B60H 1/2206 |
| DE | 202011003938 U1 | 9/2011 | |
| EP | 1674794 A1 | 6/2006 | |
| WO | 2014044570 A1 | 3/2014 | |

OTHER PUBLICATIONS

PCT International Search Report and Written Opinion, PCT/EP2021/072895, Dec. 23, 2021, 15 pages.

* cited by examiner

*Primary Examiner* — Vivek K Shirsat
(74) *Attorney, Agent, or Firm* — Quarles & Brady LLP

(57) ABSTRACT

A heating system, more particularly for heating a motor vehicle, including a fuel-operated heating device and a sensing unit, which is configured to sense the presence of fuel in the heating device at least for a first case in which there is no flame formation, more particularly both for the first case in which there is no flame formation and for a second case in which there is flame formation.

9 Claims, 2 Drawing Sheets

HEATING SYSTEM, COMPRISING A FUEL-OPERATED HEATING DEVICE

This application represents the national stage entry of PCT International Patent Application No. PCT/EP2021/072895 filed on Aug. 18, 2021 and claims priority to Ger-man Patent Application No. 10 2020 121 759.5 filed Aug. 19, 2021. The contents of each of these applications are hereby incorporated by reference as if set forth in their en-tirety herein.

DESCRIPTION

The disclosure relates to a heating system, in particular for heating a motor vehicle, to a method for filling a heating device with fuel, to a method for starting, in particular starting for the first time, a heating device or heating system, and to a use of a parameter assigned to an ignition device.

WO 2014/044570 A1 describes a method for automatic line filling in a fuel-operated heating system, comprising flame detection. In the method, a line-filling process is initiat-ed, which controls the heating system so that heating or ignition attempts of the fuel take place during the line-filling process, and the line-filling process ends when a flame is detected.

In a first process step, the fuel line can be prefilled.

An actuation time and metering pump frequency are to be selected in such a way that a fuel line is not overfilled (which would be harmful to the heating device), but the unfilled length is as short as possible. For example, in the case of a truck, the line length can be greatly dependent on the vehicle in question, and therefore after the prefilling, potentially up to several meters (for example 3 to 4 meters) of unfilled line still needs to be filled.

In the next process step, the heating can be started, wherein, deviating if necessary from the "normal start" until a flame is detected, a metering pump is operated with an increased frequency (for example 3 Hz instead of the con-ventional 1 Hz). Including all the preheating times (for example 50 seconds) and stabilization times (for example 40 seconds), a line length of for example 4.5 m can thus be filled within a predetermined (maxi-mum) first start time (for example 4 minutes).

For relatively high starting reliability when starting a heating device with an evaporator burner, in principle it is advantageous to operate with an (initially) relatively low combustion air flow (and a correspondingly small flame). However, this stands somewhat in contradiction with the requirements for an automated first start, as described above.

If the flame is not formed immediately, in the case of a continuous start-up sequence (until a possible, time-con-trolled shut down) taking place with a large amount of fuel, a potentially considerable overfilling of the heating device is to be expected.

The disclosure is therefore based on the object of pro-posing a heating system in which filling with fuel can take place relatively quickly and reducing associated disadvan-tages, such as in particular the risk of overfilling the heating device, as much as possible. The disclosure is also based on the object of proposing a corresponding method for filling a heating device, a method for starting a heating device and a use of a parameter assigned to an ignition device.

This object is achieved in particular by the features of claim 1.

The object is achieved in particular by a heating system, preferably for heating a vehicle (preferably a motor vehicle, most preferably a passenger car and/or truck), comprising a fuel-operated heating device (having an evaporator burner) and a detection unit. The detection unit is configured to detect the presence of fuel in the heating device.

The detection unit is preferably configured to detect the presence of fuel in the heating device at least for a (first) case in which there is no flame formation (or no ignition has been successfully carried out). Most preferably, the detection unit is configured to detect the presence of fuel in the heating device both in the first case in which there is no flame formation (or an ignition still has not successfully taken place) and in a second case in which there is flame formation (that is to say an ignition has been successfully carried out).

A core concept of the disclosure lies in recognizing (detecting) fuel present in the heating device (by means of the detection unit) (even) when no flame (combustion) is present. As a result (as fundamentally in the prior art as well) a relatively long (empty) fuel line can be filled quickly. However, as a result of the fact that a completed or suc-cessful filling is recognized even when no flame is produced, the probability of unwanted overfilling can be (considerably) reduced. Optionally, in the case of heating devices (not immediately) starting within a time period available for the start (first start), a second start attempt can be carried out (with conditions promoting flame production or ignition, or optionally different conditions). In particular, a second start attempt can then be carried out with a correspondingly leaner mixture. Within the scope of the disclosure, it has also been recognized that, with the above-described prior art (in particular flame recognition by means of an increase in an exhaust gas temperature) it is not possible to distinguish between a case in which fuel is (still) not present, and a case in which fuel is present, but the combustion does not start.

The heating system can be defined by a (common) assem-bly, in particular by a common (outer) housing. Alterna-tively, the heating system can also be present in the form of separate components which are interconnected (for example by means of electrical connections and/or fluid-conducting connections). According to a first alternative, in particular the detection unit and the heating device can be components of a common assembly, for example in such a way that the detection unit is arranged in a heating device housing. Alternatively, the detection unit can also be arranged (at least in part, optionally in full) externally with respect to the heating device, in particular outside a heating device hous-ing.

The heating device comprises in particular an (evapora-tor) burner.

Furthermore, the heating device preferably comprises at least one ignition device, in particular at least one glow plug, for the ignition of a fuel/air mixture.

A detection of the presence of fuel in the heating device can take place directly (by direct detection of the presence of fuel) and/or indirectly (in particular by means of at least one parameter which is influenced by a fuel that is present).

The detection unit is preferably configured to use the same parameter (in particular an input power of an ignition device, preferably of at least one glow plug) in the case in which there is no flame formation as in the case in which there is flame formation (when a detection of the presence or availability of fuel in the heating device is carried out).

The detection unit is preferably configured to take into consideration at least one parameter which is established and/or determined in conjunction with at least one other function of the heating device, in particular an open or closed-loop control function (such as establishing or determining an electrical power which is required to set an ignition device, in particular a glow plug, to a desired temperature).

Taking into consideration a parameter should be understood to mean in particular (above and in the following) that the (respective) parameter is used when carrying out the detection, for example within a corresponding calculation and/or a comparison and/or an analysis in general which is carried out by the detection unit.

The heating system, in particular the heating device, preferably comprises a control and/or computing device (for example comprising a processor, in particular a microprocessor) to carry out necessary activations and/or calculations. The control and/or computing device can comprise or form the detection unit at least in part. Conversely, the detection unit can also comprise (or form) the control and/or computing device at least in part. The control and/or computing device can form an assembly with the heating device (for example can be arranged in a common housing) or formed externally with respect to the heating device and/or the detection unit. Insofar as functionalities of the heating system and/or control and/or computing method steps are described in the following, these are preferably carried out by the control and/or computing device, and the control and/or computing device is configured accordingly.

The detection unit is preferably configured, in order to carry out the detection, to take into consideration at least one, in particular electrical and/or adjustable, optionally controllable, operating parameter of the heating system. An operating parameter of the heating system is to be understood to mean in particular a parameter which influences the type and manner of operation of the heating system, such as an electrical power for operating one or more components. Parameters which result only from a present operation (such as a parameter relating to the flame) are in particular not to be understood as operating parameters. When taking into consideration an operating parameter of this type, information which is present anyway (in general) can be used synergistically, which simplifies the structure and also the function of heating system.

Preferably, during the detection in the first case and during the detection in the second case, the same parameter(s) is/are taken into consideration for the detection. However, alternatively it is also conceivable to take into consideration various parameters, such as in the first case (in which there is no flame formation), an operating parameter (such as in particular an electrical power consumption by an/the ignition means) and in the second case another parameter, such as in particular a parameter relating to the flame formation (combustion), such as a parameter relating to an exhaust gas resulting from the combustion (e.g. temperature).

It is also conceivable to take a plurality of parameters into consideration at the same time, such as an operating parameter (e.g. electrical power for an ignition device/glow plug) and another parameter (e.g. relating to a flame production), specifically preferably in the first and/or in the second case.

In embodiments, the detection unit can be configured, in order to carry out the detection, to take into consideration at least one, electrical and/or adjustable, optionally controllable, parameter which is assigned to at least one ignition device, in particular at least one glow plug, of the heating device. The detection of the presence of fuel in the heating device can thereby be simplified, in particular in that a parameter which has to be determined or established anyway (at least conventionally) is taken into consideration or is used (in particular when setting to a constant temperature).

Preferably, the detection unit is configured to detect an electrical power for at least one (power consumption of at least one) ignition device, in particular glow plug. It is most preferable that at least one increase in an electrical power consumption (in particular in the case of a constant temperature of the ignition device or in the case of a temperature of the ignition device which is set to a constant value) can be determined (or is taken into consideration during the detection), preferably both an increase in the electrical power consumption and a decrease in the electrical power consumption (in the case of a constant temperature or a temperature set to a constant value) can be determined (or is taken into consideration during the detection). An increase in the electrical power consumption is to be understood to mean in particular an increase from a positive value to a (higher) positive value (>0). Correspondingly, a decrease is to be understood to mean in particular a change from a higher positive value to a lower positive value (>0).

When a parameter, e.g. a power or power consumption, can be detected or determined, preferably at least 10, more preferably at least 100, different parameter values can be detected or determined (by the detection unit) (in particular as a function of time) and accordingly can be evaluated for or by the detection unit (this also applies in particular for each additional parameter, in particular operating parameter, which is mentioned above and/or in the following).

When a parameter, e.g. a power or power consumption, is variable, in particular adjustable, preferably at least 10, more preferably at least 100, different parameter values can be captured, in particular adjusted (in particular as a function of time), e.g. by a/the computing and/or control unit (this also applies in particular for each additional parameter, in particular operating parameter, which is mentioned above and/or in the following).

In general, the disclosure aims to be able to retrieve (missing) information about the presence of fuel ("fuel is present") by evaluating available sensor and/or measurement values. In this case, preferably the electrical power (and/or a related parameter, such as a current and/or a voltage) is taken as a measurement variable which is required to keep constant an ignition device temperature (glow plug temperature or glow plug resistance) (which is optionally settled in the start).

An ignition device temperature (glow plug temperature) can be measured for example by means of an electrical ignition device resistance or glow plug resistance.

Preferably, at least one measuring device is provided to measure or determine the ignition device temperature.

In embodiments, it is such that for example the required heating power for the ignition device increases from initially approximately 65 to 70 W (generally: a first value) to (at least almost) 100 W (generally: a second value) as soon as fuel is conveyed into the heating device (into the burner) without a flame forming. The ignition device (the glow plug) is cooled in this case by the fuel (e.g. diesel).

However, when flame formation has taken place, the required electrical heating power decreases (considerably), since in this case, the ignition device (the glow plug) is also heated by the flame.

Preferably, a temperature of at least one (the at least one) ignition device of in particular (the) at least one glow plug can be set to a constant value (in particular by means of a corresponding computing and/or control unit of the heating system or heating device).

The detection unit is preferably configured to detect whether flame formation has taken place when there is fuel present (detected) in the heating device.

A (the) computing and/or control unit of the heating system is preferably configured to carry out a (n additional) start attempt, with an in particular leaner mixture (by comparison with a fuel/air mixture in a first start attempt) when it is established that flame formation is not present (is absent) when fuel is present (detected). It is thus possible, within a period of time available for a first start, to carry out a second (conventional or more robust) start attempt.

The above-mentioned object is further achieved in particular by a method for filling (in particular filling for the first time) a heating device (and/or heating system, as described above and/or in the following), in particular for heating a motor vehicle, with fuel, comprising the steps of:
  a) supplying the fuel to the heating device by means of at least one fuel conveying device,
  b) detecting the presence of fuel in the heating device in a (first) case in which there is no flame formation.

The step b) is preferably carried out in such a way that it can at least be recognized that fuel is present in the heating device when no flame formation has taken place (is present). However, the step b) is preferably carried out in such a way that, in each case (that is to say even in the case of flame formation) the presence of fuel can be established (detected).

Further method features can be found in the above explanation of the heating system, in particular the functional features therein (which can be carried out in the method as corresponding method steps, in particular detection and/or control steps).

Preferably, in step b), at least one parameter is taken into consideration, which parameter is assigned to at least one ignition device, in particular at least one glow plug, of the heating device.

In one embodiment of the method, an electrical heating power or power consumption of at least one ignition device, in particular at least one glow plug is detected, preferably in such a way that at least one increase in the electrical power consumption can be established, (in particular when the ignition device has a constant temperature or is set to a constant temperature), preferably both an increase in the electrical power consumption and a decrease in the electrical power consumption can be established (and is correspondingly used to detect fuel being present).

A temperature of at least one (the at least one) ignition device, in particular of (the) at least one glow plug, is preferably set to a constant value.

The above-mentioned object is achieved in particular by a method for starting, in particular starting for the first time, a heating device and/or heating system, preferably as described above and/or in the following, in particular for heating a motor vehicle, comprising the above method for filling (in particular filling for the first time) a heating device.

In the method for starting, it is preferably detected whether flame formation has taken place when fuel is present (detected) in the heating device. More preferably, another start attempt is carried out (with an in particular leaner mixture) when it is established that flame formation is not present (is absent).

The above-mentioned object is achieved in particular by the use of a parameter assigned to an ignition device (in particular of a heating device, preferably for heating a motor vehicle), in particular to a glow plug, in particular of an electrical power consumption (heating power) and/or a variable derived therefrom, to detect the presence of fuel in the heating device at least in a first case in which there is no flame formation, preferably both in the first case in which there is no flame formation and in the second case in which there is flame formation).

Further embodiments can be found in the dependent claims.

The disclosure will be described in the following with reference to exemplary embodiments which are explained in greater detail with reference to the accompanying drawings, in which.

In the following description, the same reference signs are used for like parts and parts having like effects.

Figure 1:
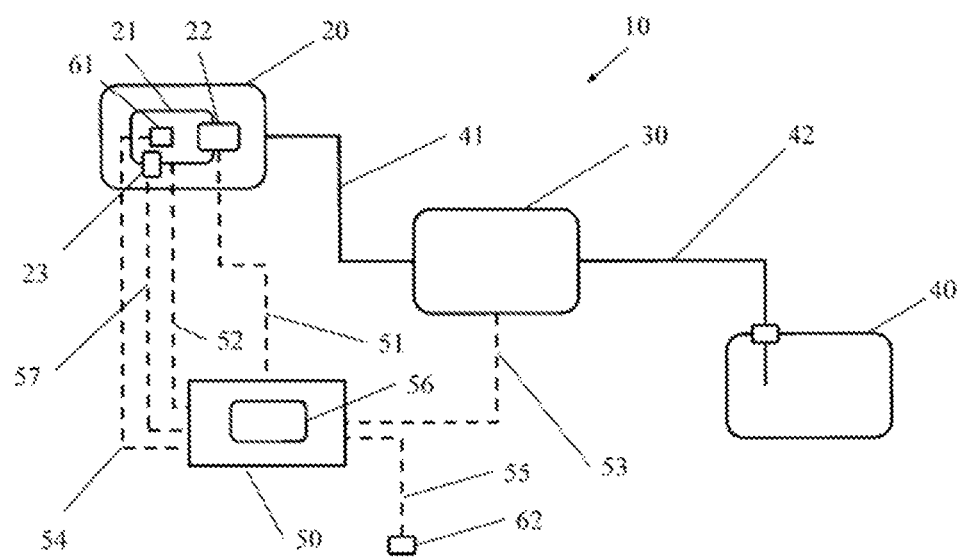
FIG. 1 shows is a schematic view of an embodiment of a heating system according to the disclosure.

FIG. 1 FIG. 1 shows a heating system 10 which can be used for example in a vehicle interior. The heating system 10 comprises a heating device 20, a metering pump 30 and a tank 40, wherein the tank 40 can be the same tank that supplies an internal combustion engine of a motor vehicle. The heating device 20 is supplied with a fuel by the metering pump 30 via a fluid line which is preferably defined as a pressure line 41, wherein the metering pump 30 conveys the fuel out of the tank 40 via a fluid line which is preferably defined as a suction line 42. Units 61, 62 such as at least one detection unit 61 and optionally a timer 62 provide or detect data via the heating system, wherein the heating system 10 further comprises a computing and/or control unit 50 which is connected to the heating device 20, the metering pump 30 and the peripheral equipment 61, 62 for example by means of electrical lines 51 to 55. The computing and/or control unit 50 preferably comprises a (n electronic) control device or is formed by such.

The detection unit 61 can be a component of the computing and/or control unit 50 or can be formed separately. In this respect, FIG. 1 is to be understood to be purely schematic.

The heating device 20 preferably has a burner 21, a glow plug 22 and a combustion air blower 23, which are each electrically controllable and are connected to the computing and/or control unit (the control device) 50 for example by means of the electrical lines 51, 52, 57. The burner 21 burns an air and fuel mixture, wherein the glow plug 22 provides the heat required for the ignition of the air and fuel mixture. By means of a heat exchanger to an exhaust gas channel of the heating device, the heat for operating a heating process can be obtained.

The metering pump 30 is preferably in the form of an electromagnetic reciprocating piston pump comprising a controllable drive for conveying the fuel out of the tank. The drive can be for example in the form of an electromagnet having a coil, wherein the coil electromagnetically moves a reciprocating piston to convey the fuel as a result of an energization which can be controlled by the computing and/or control unit (the control device) 50. The metering pump 30 thus preferably has a controllable conveying frequency at which the reciprocating piston moves back and forth in the coil. However, there can also be other types of metering pumps, for example membrane or gear pumps which have a controllable, preferably electrical or electromagnetic drive and are similarly controllable.

If the detection unit is not a component of the computing and/or control unit anyway, the computing and/or control unit (the control device) 50 can receive data signals from the detection unit 61 and optionally the timer 62 according to the embodiment, and use the data signals to control the heating device 20, the components thereof, burner 21, glow plug 22 and/or combustion air blower 23, and/or the metering pump 30.

Routines for calculating control commands for controlling the heating device 20, the components 21, 22 thereof, and/or the metering pump 30 can run on a processing unit 56 of the computing and/or control unit (of the control device) 50, wherein the computing and/or control unit (the control device) 50 can send control signals for control to the heating device 20, the components 21, 22, 23 thereof, and/or the metering pump 30 via the electrical lines 51 to 53 and 57.

It is understood that the computing and/or control unit (the control device) 50 can cause an energization of the drive of the metering pump 30, for example the coil or the electric motor. It is also possible for the heating device 20 and the metering pump 30 to each have their own computing and/or control unit, wherein the respective computing and/or control unit optionally interprets the control signals sent from the computing and/or control unit (the control device) 50 and in turn controls the metering pump and the heating device and the components thereof.

The computing and/or control unit (the control device) 50 can also optionally receive indirect data signals from a central control means via a CAN or LIN bus system. It is understood that the computing and/or control unit (the control device) 50 can be an integral component of the heating device 20 or can be in the form of an independent component.

The detection unit 61 is configured to deduce, from an electrical power for operating (heating or keeping warm) the glow plug, whether fuel is present in the heating device or not, which will be explained in greater detail in the following.

Figure 2:
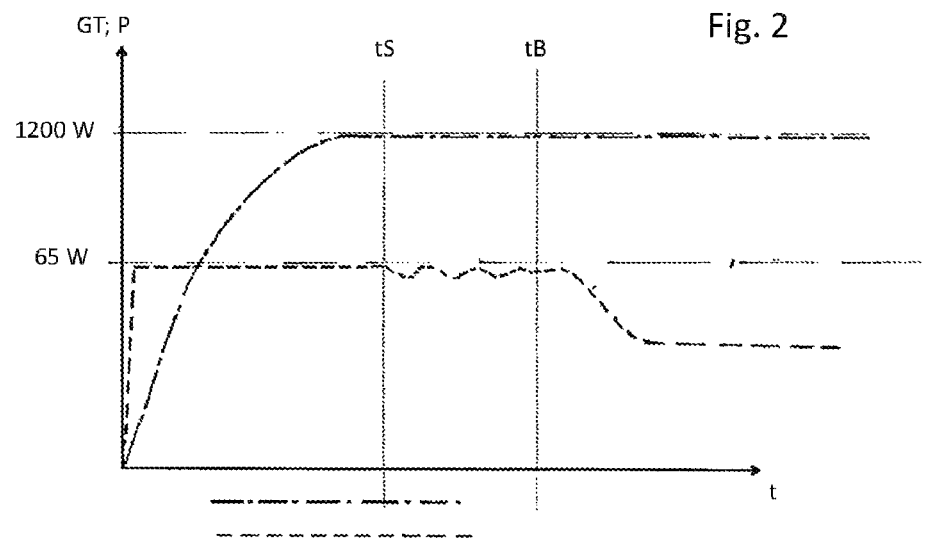
FIG. 2 shows a first temperature/time diagram for illustrating the disclosure.

FIG. 2 shows a diagram of the glow plug temperature GT or electrical control power P of the glow plug over time t. From the point in time 0 (coordinate origin) or shortly thereafter, the glow plug is supplied with power (in the present case with 65 W) so that after some time (shortly before the point in time tS=start of conveying fuel) it reaches the predetermined temperature thereof (in the present case for example 1,200° C.). The fuel conveying is then started (at the point in time tS). To keep the temperature constant, the power is adapted accordingly, which can be seen from the undulating progression between the points in time tS and tB (=fuel is present in heating devices).

At the point in time tB, fuel (BS) is present in the heating device (for the first time). In this device as well, the glow plug temperature is kept constant by adapting the power accordingly. However, since heat is generated as a result of the combustion, the electrical power required to keep the temperature constant decreases (in the present case to 1,200° C.). By evaluating the electrical power (in particular the change therein as a function of time), the detection unit (61) then detects firstly that the fuel is actually present in the heating device, and secondly that this has taken place while forming a flame. In this case, a corresponding start attempt has successfully taken place.

Figure 3:
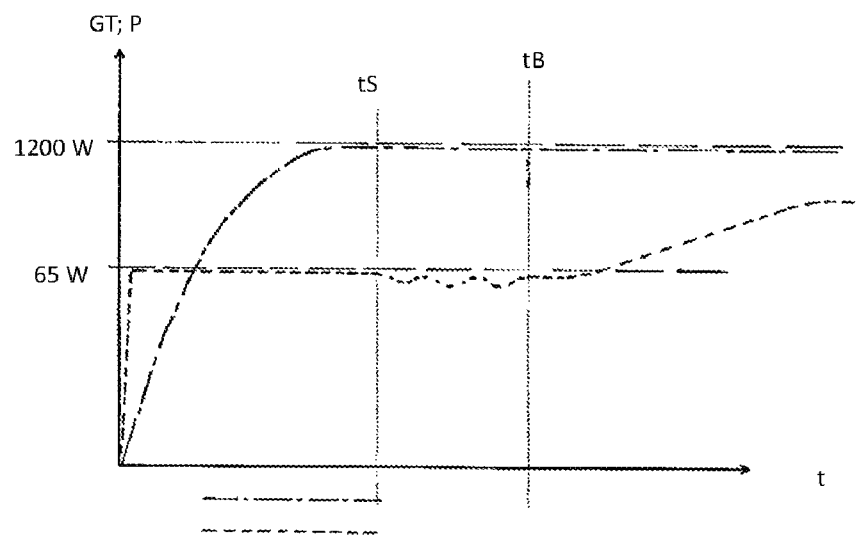
FIG. 3 shows a second temperature/time diagram for illustrating the disclosure.

FIG. 3 shows a diagram which is analogous to FIG. 2. However, in contrast with FIG. 2, in this case no flame formation takes place (immediately) after the point in time tB, at which fuel is present in the heating device. Specifically, however, the progressions of the temperature and power correspond to those from FIG. 2 until the point in time tB, at which fuel is present in the heating device.

Also thereafter, the progression of the temperature is in accordance with FIG. 2 in this respect, since in FIG. 3 as well, the temperature is kept at a constant value (in this case for example 1,200° C. as well). However, since flame formation stops thereafter, and the flame thus does not provide any support by means of a heat input, but the amounts of fuel then available are still evaporated by means of electrical energy, an increasing amount of power is then required to keep the temperature at the desired value. The power curve thus rises in contrast with FIG. 2 (and does not drop). In this case as well, the detection unit evaluates this progression (in particular the increase or rise in power consumption) so that the presence of fuel can be recognized reliably (and specifically relatively quickly).

At this point, it should be noted that all the above-described parts are claimed as essential to the invention disclosure in isolation and in every combination, in particular the details shown in the drawings. Modifications thereto are familiar to a person skilled in the art.

REFERENCE NUMERALS

10 heating system
20 heating device
21 burner
22 glow plug
23 combustion air blower
30 metering pump
40 tank
41 line segment, pressure line
42 line segment, suction line
50 computing and/or control unit (control device)
51 electrical line
52 electrical line
53 electrical line
54 electrical line
55 electrical line
56 processing unit
57 electrical line
61 detection unit
62 timer

The invention claimed is:

1. A heating system for heating a motor vehicle, comprising a fuel-powered heating device and a detection unit which is configured to detect the presence of fuel in the heating device at least in a first case in which there is no flame formation, wherein
   the detection unit is configured, in order to carry out the detection, to use an electrical power consumption of at least one ignition device within a corresponding calculation and/or comparison and/or analysis and further wherein a control device of the heating system is configured to carry out an additional start attempt, with a leaner mixture, when it is determined that flame formation is not present when fuel is present.

2. The heating system as claimed in claim 1, wherein the detection unit is configured, in order to carry out the detection, to use at least one operating parameter of the heating system.

3. The heating system as claimed in claim 1, wherein the detection unit is configured, in order to carry out the detection, to use at least one parameter which is assigned to the at least one ignition device of the heating device.

4. The heating system as claimed in claim 1, wherein a temperature of at least one ignition device can be controllable to a constant value.

5. The heating system as claimed in claim 1, wherein the detection unit is configured to detect whether flame formation has taken place when a fuel is present in the heating device.

6. The heating system as claimed in claim 1, wherein the detection unit is configured to detect the presence of fuel in the heating device in a second case in which there is flame formation.

7. The heating system as claimed in claim 1, wherein the at least one ignition device comprises at least one glow plug, whose power consumption is used.

8. The heating device as claimed in claim 1, wherein the electrical power consumption of the at least one ignition device is used in such a way that at least an increase in the electrical power consumption can be determined.

9. The heating device as claimed in claim 1, wherein the electrical power consumption of the at least one ignition device is used in such a way that an increase and a decrease in the electrical power consumption can be determined.

* * * * *